Figure 1:
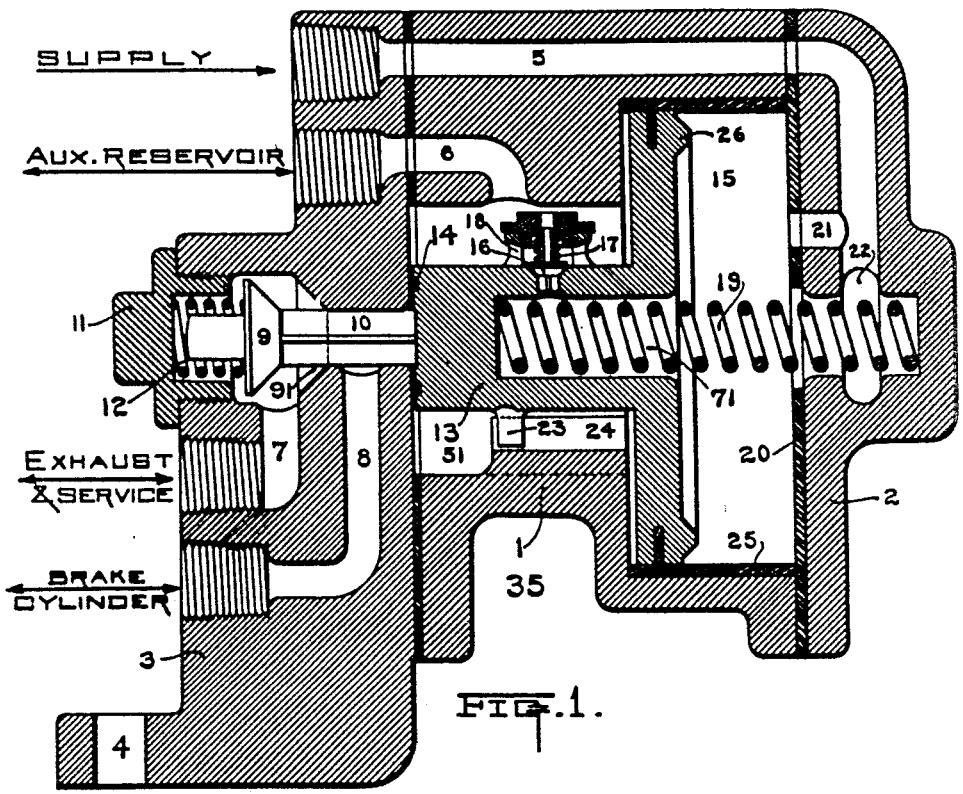

J. E. OSMER.
AIR BRAKE VALVE.
APPLICATION FILED OCT. 10, 1910.

1,113,679.

Patented Oct. 13, 1914.

WITNESSES-
W. H. Lieber.
Ella Brickell

J. E. Osmer  INVENTOR
BY _____ ATTORNEY.

UNITED STATES PATENT OFFICE.

JOHN E. OSMER, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

AIR-BRAKE VALVE.

1,113,679.  Specification of Letters Patent.  Patented Oct. 13, 1914.

Application filed October 10, 1910. Serial No. 586,133.

*To all whom it may concern:*

Be it known that I, JOHN E. OSMER, a citizen of the United States, residing at Milwaukee, in the county of Milwaukee and State of Wisconsin, have invented a certain new and useful Improvement in Air-Brake Valves, of which the following is a specification.

This invention relates to improvements in the construction of combined straight and automatic air brake mechanisms and more specifically to improvements in the construction of valve mechanisms which permit the making of service applications and at the same time insure a positive and rapid setting of the brakes in cases of emergency.

The object of the invention is to provide a combined straight and automatic air brake valve which is simple in construction, and efficient in operation.

A clear conception of one embodiment of the invention can be obtained by referring to the accompanying drawing in which like reference characters designate the same parts in different views.

Figure 2:
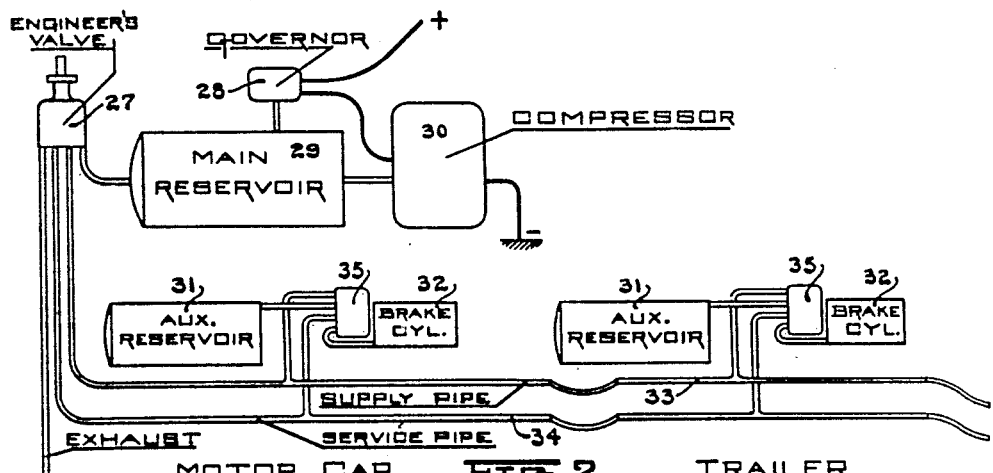

Figure 1 is a central vertical section through a combined straight and automatic valve for air brakes. Fig. 2 is a diagrammatic representation of an air brake equipment as applied to a motor car and trailer, showing valves as disclosed in Fig. 1, forming a part of the equipment. The body portion of the valve 35, see Fig. 1, is constructed of three essential parts, namely, the base or bracket 3, the cylinder 1, and the head or cap 2. The end of the bracket 3 is fastened to an end of the cylinder 1, the joint between the members being packed against the outward leakage of air by means of a suitable gasket, and the fastening of the members being accomplished by bolts or other suitable means, not shown. The end of the cap 2 is fastened to an end of the cylinder 1, the joint between the members being packed against outward leakage of air by means of a suitable gasket 20, and the fastening of the members being accomplished by bolts or other suitable means, not shown. The valve is suspended from the car body by means of cap screws or bolts which pass through holes 4 formed in the valve base 3.

The valve cylinder 1 has a main piston chamber 15 of relatively large diameter extending inward from the cap end thereof through approximately half its length. The chamber 15 is lined with a suitable wearing bushing 25. A chamber 51 of relatively small diameter extends inwardly from the base end of the cylinder 1 and connects with the inner end of the chamber 15.

The piston 13 closely coacts with its periphery against the lining bushing 25 of the chamber 15, and has an annular projecting ridge 26 formed at the cap end thereof. The end of the ridge 26 is accurately machined so that when the piston 13 is at the extreme right of the chamber 15, the end of the ridge 26 coacts to form a tight joint with the gasket 20. The spring 19 which extends into a recess 71 formed in the center of the piston 13 and coacts with the bottom thereof, coacts at its outer end with the bottom of a recess formed in the cap 2, and tends to keep the piston 13 in extreme left position, as shown.

The reduced portion of the piston 13 is of slightly greater length than the chamber 51, and has an annular seating ring 14 fastened to its end, which ring coacts against the base 3 forming a tight puppet-valve joint therewith. The projecting lug 23 extends into a groove formed between radially inwardly projecting ribs 24 of the cylinder 1, and prevents rotation of the piston 13 within the cylinder 1. The feed valve 16 which is normally closed by a spring 17, is housed in an outwardly projecting hollow cylindrical lug formed on the piston 18, and controls a port connecting the recess 71 with the chamber 51 through the passages 18 formed in the walls of the housing.

The emergency puppet valve 9 has guides 10 projecting toward the cylinder 1, against which the end of the piston 13 normally coacts, thus keeping the puppet valve 9 away from its seat on port 91 connecting the operating chamber of the valve 9 with the chamber 51 on the left side of the piston 13. The spring 12, which coacts with the outer end of the puppet valve 9, coacts at its opposite end with the bottom of a recess formed in the cap 11 and tends to close the puppet valve 9 against the action of the spring 19 acting on the piston 13.

The passage 5 which connects with the emergency or supply pipe 33, see Figs. 1 and 2, passes through the base 3, cylinder 1 and cap 2, and enters the chamber 15 through ports 21, 22. The passage 6, which connects with the auxiliary reservoir 31, passes through the base 3 and cylinder 1 and enters the chamber 51. The passage 7 which connects with the engineer's valve 27 through the train or service pipe 34, enters the operating chamber of the valve 9. The passage 8 which connects with the brake cylinder 32, enters the chamber formed below the puppet valve 9, in which the guides 10 of the valve 9 are located. With the valve 9 in open position as shown, the passages 7, 8, are connected by means of the port 91 controlled by the valve.

The engineer's valve 27 is of a type adapted to admit compressed air from the main reservoir 29 to the brake system and to make service applications. The compressor 30 which may be of any of the well known types, is under the control of a fluid pressure regulator or governor 28. As shown, the valve 35 has been applied to a motor car and only one trailer, but this should not be considered a necessary limitation since as many trailers as desired could be connected into the system without affecting the efficiency of the device.

During the operation of the device, it is first necessary to charge the auxiliary reservoirs 31. This is done by opening communication through the engineer's valve 27, between the main reservoir 29 and the supply pipe 33. The air under pressure thus admitted to the supply pipe from reservoir 29 flows through the passage 5 into the main piston chamber 15, forcing the piston 13 to the extreme left, as shown. The compressed air in the chamber 15 passes through the recess 71, and after forcing the feed valve 16 upwardly against the action of spring 17, enters the chamber 51 through passages 18. From the chamber 51 the compressed air flows through the passage 6 to the auxiliary reservoir 31, thus charging the reservoir 31 to a pressure approximately equal to but always slightly less than that in the supply pipe 33. When the pressures in the supply pipe 33 and auxiliary reservoir 31 have been thus approximately equalized, the spring 17 becomes effective and closes the feed valve 16. The piston 13 continues to be held in the extreme left position as shown, by the action of the spring 19, as the pressures on opposite sides of the piston 13 are approximately equal and the areas of opposite sides of the piston are approximately equal.

With the auxiliary reservoir 31 and the supply pipe 33 thus charged, it will be noted that if for any reason the pressure of the supply pipe 33 is reduced, such as by the parting of a hose supply pipe coupling between the motor car and trailer, or the bursting of the supply pipe 33 itself, the pressure in the chamber 15 is reduced. The auxiliary reservoir air pressure acting on the left side of the piston 13 will automatically move the piston 13 toward the right thus allowing the puppet valve 9 by the pressure of spring 12 to move toward the right to close the communication between the passages 7, 8, forming a conduit between the service pipe 34 and the brake cylinder 32. At the same time this movement of piston 13 opens communication past ring 14 and through port 91 between chamber 51 and passage 8 leading to the brake cylinder 32. Air under pressure is then admitted from the auxiliary reservoir 31 through passage 6, chamber 51, port 91 and passage 8 to the brake cylinder 32. This admission of pressure causes an automatic emergency setting of the brakes. Pressure on the piston area within ring 14 aids the piston motion.

A manual emergency application of the brakes may be accomplished by sudden reduction of pressure in the supply pipe 33 by operating the engineer's valve 27 so as to connect the supply pipe with exhaust. Constructing the engineer's valve 27 for gradual reduction in supply pipe pressure will provide means for securing a gradual application of the brakes by pressure from the auxiliary reservoir. With the brakes set in full emergency position, the ridge 26 of the piston 13 bears firmly against the gasket 20, thus preventing leakage of air from the auxiliary reservoir 31 around the piston 13 to the supply pipe 33 in which the pressure has been reduced.

After emergency application, the pressure in the supply pipe 33 is restored through the engineer's valve in "full release" position thus causing the piston 13 to move toward the left to open valve 9 by impact therewith and to cut off communication between the auxiliary reservoir and the brake cylinder. Following this, the recharging of the auxiliary reservoir takes place through the feed valve 16. The "full release" position of the engineer's valve insures release of brakes.

With the piston 13 to the extreme left as shown, the system is ready for normal service or "straight air" application of the brakes. The service application is made by admitting air from the main reservoir 29 through the engineer's valve 27, service pipe 34, port 91 and passage 8 to the brake cylinder 32. Such applications of the brakes can be made as gradual as desired.

After a full service application is made the engineer's valve can be set to emergency position and cause air in auxiliary reservoir to feed to brake cylinder already under pressure from the main reservoir through the service pipe, thus increasing the pressure and securing greater braking power.

In order to release the brakes after service setting thereof, communication is made, through the engineer's valve 27, between the service pipe 34 and the exhaust. This is "release" position of the engineer's valve and permits the pressure in the brake cylinder 32 to be reduced to atmospheric, thus releasing the brakes. At this release setting of the engineer's valve communication is also made through the engineer's valve between the main reservoir and the supply pipe. At all other positions of the engineer's valve except emergency and full release position, that is, in either service, partial release, or lap positions, air passes from the main reservoir to the supply pipe through small ports in the engineer's valve.

It may be noted that it would be possible to obtain full brake pressure through the service pipe 34, but the action of such pressure in a train of several cars length would not be rapid enough to serve as an emergency application. By permitting the emergency application to take place upon reduction of pressure in the supply pipe 33, a more rapid setting of the brakes is effected, because the air supply is directly adjacent the brake cylinder.

The construction on the valve body in three parts permits easy access to all elements of the mechanism. The valve 9 and spring 12 can be removed by removing the cap 11. The piston 13 and elements carried thereby, as well as the spring 19, can be removed by removal of the valve cap 2. In actual construction of the valve, however, means should be provided for guiding the spring 19, but such means have been omitted as they form no part of the invention and would tend to complicate the drawing. Another feature of the construction is that the use of slide valves has been eliminated, thus avoiding the undesirable wear encountered in such valves.

The location of the straight air ports and passages in the bracket 3 permits of the installation of a straight air equipment at first by omitting the cylinder 1 and cap 2 and blanking off the central port in the face of the bracket and through which the puppet valve 9 is guided. Later on the automatic features of the present disclosure can easily be added by opening up the central port and bolting on the cylinder 1 and cap 2 with the contained mechanism.

It should be understood that it is not desired to be limited to the exact details of construction shown and described, for obvious modifications will occur to a person skilled in the art.

It is claimed and desired to secure by Letters Patent,—

1. In an air brake valve, a bracket for attachment to a car body, "straight air" ports and passages in said bracket, a valve for controlling said ports and passages, and a cylinder having emergency features, attachable to said bracket.

2. In an air brake valve, a piston, means for preventing rotation of said piston, an auxiliary reservoir in communication with a portion of one side of said piston, a main reservoir communicable to the other side of said piston, means for subjecting an additional portion of said first side of said piston to pressure from said auxiliary reservoir upon a reduction of pressure on said piston from said main reservoir, and means for establishing a pressure in said auxiliary reservoir less than that in said main reservoir, said means being adapted to permit the flow of air from said main reservoir to said auxiliary reservoir irrespective of the position of said piston.

3. In an air brake valve, a bracket, "straight air" ports and passages in said bracket, a valve controlling said ports and passages, and a capped opening in said bracket opposite said valve through which said valve may be passed.

4. In an air brake valve, a piston controlling "automatic air" ports and passages, and a valve separate from said piston and controlling "straight air" ports and passages, said valve and piston being in axial alinement and said piston controlling movement of said valve.

In testimony whereof, I affix my signature in the presence of two witnesses.

JOHN E. OSMER.

Witnesses:
W. H. LIEBER,
CHAS. L. BYRON.

Copies of this patent may be obtained for five cents each, by addressing the "Commissioner of Patents, Washington, D. C."